UNITED STATES PATENT OFFICE.

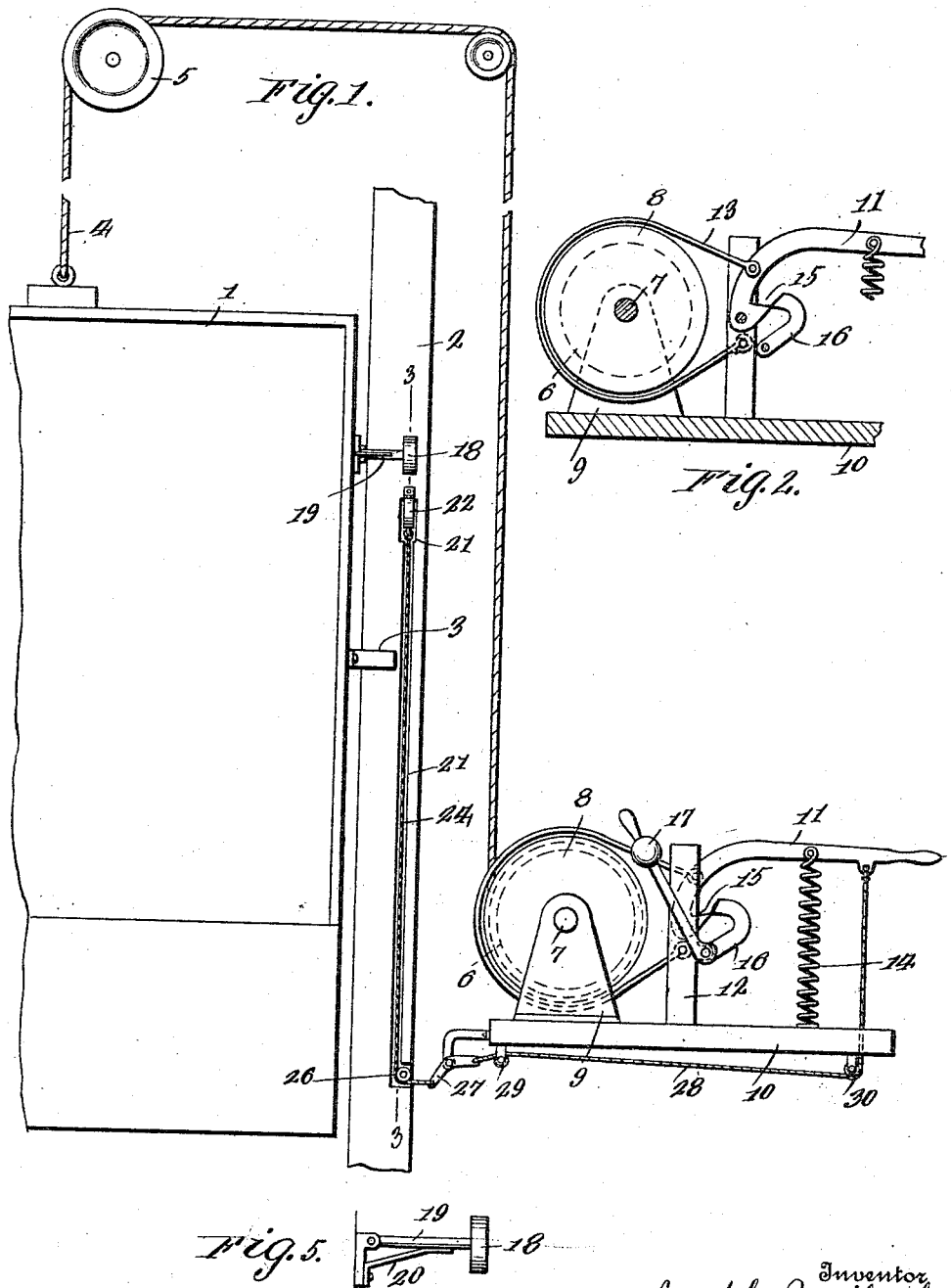

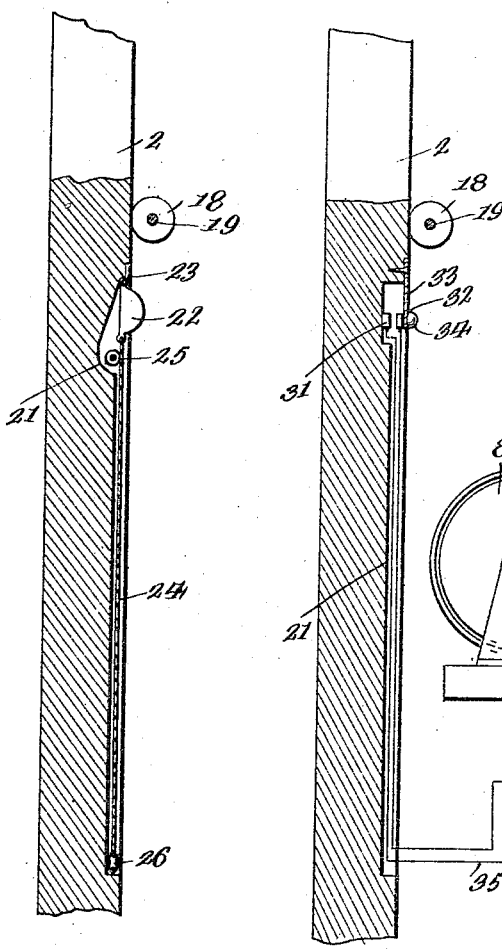
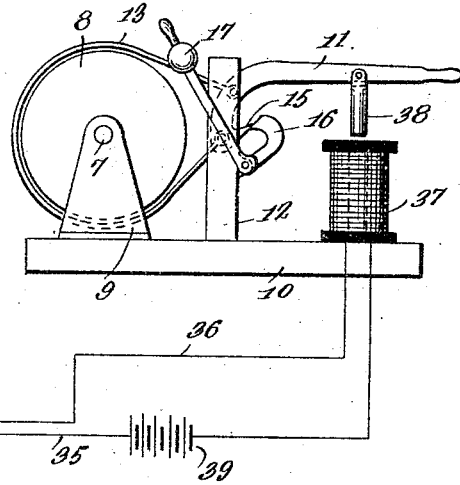

JOSEPH ZWEIBACK, OF KIMBERLEY, SOUTH AFRICA.

ELEVATOR-BRAKE.

1,235,513.  Specification of Letters Patent.  Patented July 31, 1917.

Application filed August 17, 1914. Serial No. 857,244.

*To all whom it may concern:*

Be it known that I, JOSEPH ZWEIBACK, a subject of the King of Great Britain, residing at Kimberley, Cape Province, and Union of South Africa, have invented certain new and useful Improvements in Elevator-Brakes, of which the following is a specification.

The object of my invention is to provide an elevator brake the parts of which are so constructed and arranged that as the elevator car approaches either of its extreme points of travel, the brake is applied to stop the travel of the car and the car is held against movement in either direction.

A further object is to so construct the parts of the brake that this brake may be set either automatically or manually and when once set automatically cannot be released except by manual manipulation.

With other objects in view, which will be referred to, my invention consists in the peculiar combination and novel arrangement of parts, such as will be hereinafter more fully described in connection with the accompanying drawings and more particularly pointed out in the appended claims.

In the drawings:—

Figure 1 is a view in side elevation showing the car approaching one of its extremities of travel and illustrating the relative positioning of the parts.

Fig. 2 is a view in elevation of the brake mechanism with parts broken away more clearly to illustrate the structure.

Fig. 3 is a vertical sectional view on the line 3—3 of Fig. 1 through one of the car guides.

Fig. 4 is a view in elevation with parts in section to illustrate a modified form of brake operating means.

Fig. 5 is a detail view of the brake actuating means connected on the car.

The elevator car 1 is mounted to travel between guides 2, only one of which is shown in the disclosure in Fig. 1, and shoes 3 are provided to hold the car in the proper relation with respect to the guides 2. A cable 4 is provided to move the car 1 up and down in the shaft, this cable extends up over a sheave 5 and is then brought down and around to be wrapped around a drum 6 mounted on the power shaft 7 which shaft may derive its power from any suitable source as for instance by belt or gearing from a steam engine, motor or other power transmission means.

The shaft 7 in addition to the cable drum 6, has a brake wheel 8 rigidly secured thereon and this shaft is mounted to turn in the bearing 9 provided on the base 10. A brake lever 11 is pivotally mounted on a support 12 provided on the base 10 and a brake band 13 is connected at one end with the standard 12 and at its opposite end with the lever 11 so that as the lever is swung in a downward direction the brake band is tightened around the brake wheel 8 and through its frictional contact with the surface of this wheel the rotation of the shaft 7 will be stopped. A spring 14 is provided to normally hold the brake lever 11 at a position that the brake band is loose around brake wheel 8 and the shaft 7 is free to rotate. The brake lever 11 is provided with a catch 15 and a latch 16 is pivotally connected on the support 12 and has a weighted hand lever 17 connected therewith in such a manner that as the brake lever 11 is swung in a downward path to tighten the brake band 13 around the brake wheel 8, this latch 16 is swung to a position to engage with the catch 15 and the brake lever is held at a position that the brake band bears against the brake wheel, from which position the parts can be released only by swinging the weighted hand lever 17 to a point that the latch 16 is swung out of the path of the catch 15 and the spring 14 is again permitted to raise the brake lever 11 to release the brake band 13.

An idler wheel 18 has a shaft 19 pivotally connected with the side of the car in such relation that this idler wheel bears and turns against the side of one of the guides 2, a spring 20 being provided to bear against the shaft 19 and hold the wheel positively in varying contact against the guides. The guide 2 is channeled out on the side against which the idler wheel 18 bears and in vertical alinement with this wheel, the channel portions being provided at a point adjacent the position at which the car is stopped in its one extremity of travel. A block 22 is hinged at 23 within the channel portions to normally project from the face of the guide 1 as better shown in Fig. 3, so that it is in the path of travel of the wheel 18, and a cable 24 passes over pulleys 25 and 26 to connect the swinging end of the block 22 with one of the arms of a bell-crank lever 27 pivoted at its angle on the base 10 of the brake. A second cable 28 is wound over the pulleys 29 and 30 and is connected at its end with the free arm of the bell-crank lever 27 and with the brake lever 11.

In operation, it is preferable that a block 22 and the mechanism connected therewith to actuate the brake-operating lever be mounted near both extremities of travel of the car and then, in case the engine driver misjudges the distance which the car has to travel and the power is not shut off soon enough, if the operator is otherwise engaged when the car should be stopped, or if for any other reason, power is not shut off at the proper time, the wheel 18 will bear against the block 22 forcing this block into the channeled-out portion 21 and exerting a drawing tension upon the cable 24 to swing the bell-crank lever 27 around its pivotal connection and to draw the brake lever 11 down to a point that the brake band 13 is brought into contact with the brake wheel 8 and the latch 16 engages with the catch 15 of the hand lever. With the parts in this relation, the rotation of the shaft 7 is stopped and the ceasing of the winding onto or unwinding from of the cable 4 with respect to the cable drum 6 stops the travel of the car, the parts being held in this position with the car stopped until the brake lever 11 is manually moved from the position with the brake band 13 in frictional contact with the brake wheel 8.

In the disclosure in Fig. 4 electrical means is substituted for the mechanical means shown in Fig. 1 to bring the brake lever automatically to a position that the brake band 13 bears against the brake wheel 8. In this disclosure the channel portion 21 has a contact member 31 mounted therein and a second contact member 32 is mounted on a spring plate 33 provided with a block 34 thereon in position to be engaged by the wheel 18 as the car moves toward its extremity of travel and to be depressed to a position that the contacts 31 and 32 are brought together. Circuit wires 35 and 36 are connected with the contacts 31 and 32 and leads to a solenoid coil 37 which is positioned adjacent the brake lever 11 and the solenoid core 38 is mounted on the brake lever in such relation that as the two contacts are brought together and the coil is energized this core will be drawn into the coil and the brake lever will be swung downwardly around its pivotal connection on the support 12 a sufficient distance that the brake band will be brought into frictional contact with the brake wheel and the parts will be locked in this relation, a battery or other suitable source of electrical energy 39 being provided in the circuit wires 35 and 36 to energize the coil as the contacts are brought together.

From the foregoing it will be seen that I have provided a brake which automatically and positively stops the travel of the elevator car when it has reached its extremity of up or down movement.

While I have herein shown and described only specific forms of my invention, it will be understood that slight changes might be made in the form and arrangement of the several parts without departing from the spirit and scope of my invention, and hence I do not wish to be limited thereto except for such limitations as the claims may import.

I claim:—

1. An elevator car brake comprising a brake wheel to control the travel of the car, a brake band received about said brake wheel, a support in proximity to said brake wheel, a brake lever pivotally mounted on said support, one end of said brake band being connected with said support and the other end of said brake band having connection with said brake lever, means associated with said brake lever normally tending to retain said brake band out of frictional contact with said brake wheel, means to be actuated by the elevator car at certain times to cause the setting of said brake level whereby said brake band will be brought into frictional contact with the brake wheel, and means to automatically lock said brake lever in a set position, as and for the purpose specified.

2. An elevator car brake comprising a brake wheel to control the movement of the car, a brake band received about said wheel, a support arranged in proximity to said brake wheel, said brake band having one end attached to said support, a brake lever pivotally mounted on said support, the other end of said brake band having connection with said brake lever, a spring to normally retain said brake lever in a position whereby said brake band may be held out of frictional contact with said brake wheel, a catch on one end of said brake lever, a latch member pivotally mounted on said support, means to be operated by the elevator car at certain times to draw said brake lever to a set position and cause said brake band to be brought into frictional contact with said brake wheel, whereby said latch member will automatically lock said brake lever in a set position by coöperation with said catch, a weighted lever to facilitate the automatic actuation of said latch member, and said weighted lever being manually operable to unlock said latch, as and for the purpose specified.

In testimony whereof I affix my signature in presence of two witnesses.

JOSEPH ZWEIBACK.

Witnesses:
 LEONARD ISAACS,
 A. E. ERLANK.

Copies of this patent may be obtained for five cents each, by addressing the "Commissioner of Patents, Washington, D. C."